(12) United States Patent
Radenbaugh et al.

(10) Patent No.: US 10,040,348 B2
(45) Date of Patent: Aug. 7, 2018

(54) STANDING ELECTRIC GOLFBOARD

(71) Applicants: Michael Jay Radenbaugh, Seattle, WA (US); Robert Anthony Wilk, Mi Wuk Village, CA (US); Starling T Faraon, Princeville, HI (US); Dean F Fuschetti, Rumson, NJ (US); Joseph Israel Wolf, Garberville, CA (US)

(72) Inventors: Michael Jay Radenbaugh, Seattle, WA (US); Robert Anthony Wilk, Mi Wuk Village, CA (US); Starling T Faraon, Princeville, HI (US); Dean F Fuschetti, Rumson, NJ (US); Joseph Israel Wolf, Garberville, CA (US)

( * ) Notice: Subject to any disclaimer, the term of this patent is extended or adjusted under 35 U.S.C. 154(b) by 0 days.

(21) Appl. No.: 15/785,311

(22) Filed: Oct. 16, 2017

(65) Prior Publication Data

US 2018/0037111 A1    Feb. 8, 2018

Related U.S. Application Data

(63) Continuation-in-part of application No. 15/003,435, filed on Jan. 21, 2016, now Pat. No. 9,862,434.

(51) Int. Cl.
*B62D 51/02* (2006.01)
*B60K 17/34* (2006.01)
(Continued)

(52) U.S. Cl.
CPC .............. *B60K 17/358* (2013.01); *B60K 1/00* (2013.01); *B60K 7/0007* (2013.01); *B60K 17/354* (2013.01); *B60K 17/356* (2013.01); *B62D 51/001* (2013.01); *B62D 51/005* (2013.01); *B62D 51/02* (2013.01); *F16D 59/02* (2013.01);
(Continued)

(58) Field of Classification Search
CPC ...... B60K 1/00; B60K 17/358; B60K 17/354; B60K 7/0007; B62D 51/001; B62D 51/005; B62D 51/02; F16D 63/002; F16D 2121/20; F16D 59/02
See application file for complete search history.

(56) References Cited

U.S. PATENT DOCUMENTS 5,775,467 A * 7/1998 Knuth .................. B60T 8/4266
                                                                188/161
5,997,018 A * 12/1999 Lee .................... A63C 17/0046
                                                                280/11.28

(Continued)

*Primary Examiner* — James A Shriver, II
*Assistant Examiner* — Brian L Cassidy
(74) *Attorney, Agent, or Firm* — Mark S Hubert PC

(57) ABSTRACT

A motorized golfboard with bi-axle four wheel steering controlled by the horizontal force applied to a stability bar extending vertically from golfboard's frame. Steering this way is accomplished using three design features. First, a vertically angled pivot point behind the front wheel assembly and one in front of the rear wheel assembly. Second, structurally, the front and rear axles axles lie beyond the front and rear of the golfboard deck and frame. Third, the pivot points are centered on spring plates extending angularly upward from the horizontal, bottom face of the frame of the golfboard, so as to be disposed at an acute angle with respect to the deck of the golfboard. In combination, these three features work to allow the inboard wheels to move closer together and the outboard wheels to move further apart when the stability bar is forced to the side.

8 Claims, 13 Drawing Sheets

(51) Int. Cl.
*B60K 7/00* (2006.01)
*B60K 17/356* (2006.01)
*B60K 1/00* (2006.01)
*B60K 17/354* (2006.01)
*B62D 51/00* (2006.01)
*F16D 59/02* (2006.01)
*F16D 63/00* (2006.01)
*B60L 7/24* (2006.01)
*B60R 9/08* (2006.01)
*B62D 1/12* (2006.01)
*F16D 121/20* (2012.01)
*F16D 121/22* (2012.01)

(52) U.S. Cl.
CPC ...... *F16D 63/002* (2013.01); *B60K 2001/001* (2013.01); *B60L 7/24* (2013.01); *B60R 9/08* (2013.01); *B60Y 2200/86* (2013.01); *B62D 1/12* (2013.01); *F16D 2121/20* (2013.01); *F16D 2121/22* (2013.01)

(56) References Cited

U.S. PATENT DOCUMENTS

| | | | |
|---|---|---|---|
| 7,837,204 B1* | 11/2010 | Groenenboom | A63C 17/0093 280/11.27 |
| 2002/0063006 A1* | 5/2002 | Kamen | A63C 17/01 180/171 |
| 2004/0262871 A1* | 12/2004 | Schreuder | B60P 3/007 280/87.1 |
| 2009/0255747 A1* | 10/2009 | Kasaba | B62D 51/02 180/208 |
| 2016/0158635 A1* | 6/2016 | Aders | A63C 17/12 180/65.1 |
| 2016/0206949 A1* | 7/2016 | Murphy | A63C 17/013 |
| 2016/0318562 A1* | 11/2016 | Mainville | B62D 51/001 |
| 2018/0036626 A1* | 2/2018 | Carlson | A63C 17/12 |
| 2018/0056152 A1* | 3/2018 | Reimers | A63B 55/61 |

* cited by examiner

STANDING ELECTRIC GOLFBOARD

PRIORITY

This utility patent application incorporates by reference, and is a continuation in part of Utility application Ser. No. 15/003,435 entitled "Standing Electric Vehicle for Golf Course Travel" and filed on Jan. 21, 2016.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to standing electric vehicles primarily intended for transportation of a single person and their golf clubs about a golf course. More particularly, to the novel design of manually tuneable four wheel steering of electric four wheeled golfboards using the personal stability bar.

BACKGROUND

Motorized golf carts have been the primary method of transportation about golf courses in the US. They have drawbacks with their size, weight and cost. They hold two golfers and their carts. Their loaded weight is enough to damage wet greens and on many courses, they must stay on the cart paths. Often using a cart does offer any time advantage over a foursome that is pulling manual carts. The young crowd just does not see the "wow" or excitement factor in driving one of these lumbering giants. They move slow and handle predictably. Additionally, transporting these to different golf courses requires a trailer.

The demographics of golfing are changing. Older golfers are quitting/retiring but this void has not been picked up by the younger "X" generation. This generation was the skateboard, wakeboard and snowboard generation. It would be an attractive option to offer some sort of standup deckboard powered vehicle appealable to the "X" or "board" generation so as to entice newer golfers to the sport. It would have to be fun but safe to drive, economical to purchase, quick, light, safe, easy to build operational proficiency. Another important option would be for it to have a minimal storage profile so as to fit into a car trunk, eliminating the need for trailers. From a golf course owner's point of view, it should have a footprint that is golf course friendly and able to move through any type of terrain on the golf course at a good speed. These would allow the device to be used not only only on the cart paths, but everywhere. This would speed up the time to golf a round, offering the golf courses a larger throughput.

Henceforth, a zippy, safe, golf course friendly, electric vehicle that offers operational stability and safety, would fulfill a long felt need in the golf industry. This new invention utilizes and combines known and new technologies in a unique and novel configuration to overcome the aforementioned problems and accomplish this.

BRIEF SUMMARY

In accordance with various embodiments, an electric golfboard is provided that can be steered turned by pushing on the stability bar, leaning, or both.

In one aspect, a four wheeled golfboard with a stability bar (vertical handhold) that can enable four wheel steering so as to offer stability, and enhance the vehicle's turning radius, is provided.

In another aspect, a motorized four wheel golfboard having manually adjustable suspension and manually adjustable turning radius for an applied stability bar steering force.

In another aspect, a fast electric vehicle capable of traversing all the types of terrain encountered on a golf course while retaining a neutral camber on all four wheels so as prevent damage to the course, is provided.

In yet another aspect, a single person electric vehicle having a platform deck with a low center of gravity, similar to that of a skateboard or snowboard that is capable of carrying one person and one set of clubs is provided.

In yet another aspect, a safe, easy and fun to operate golfboard that has the performance to attract the younger "board" generation is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
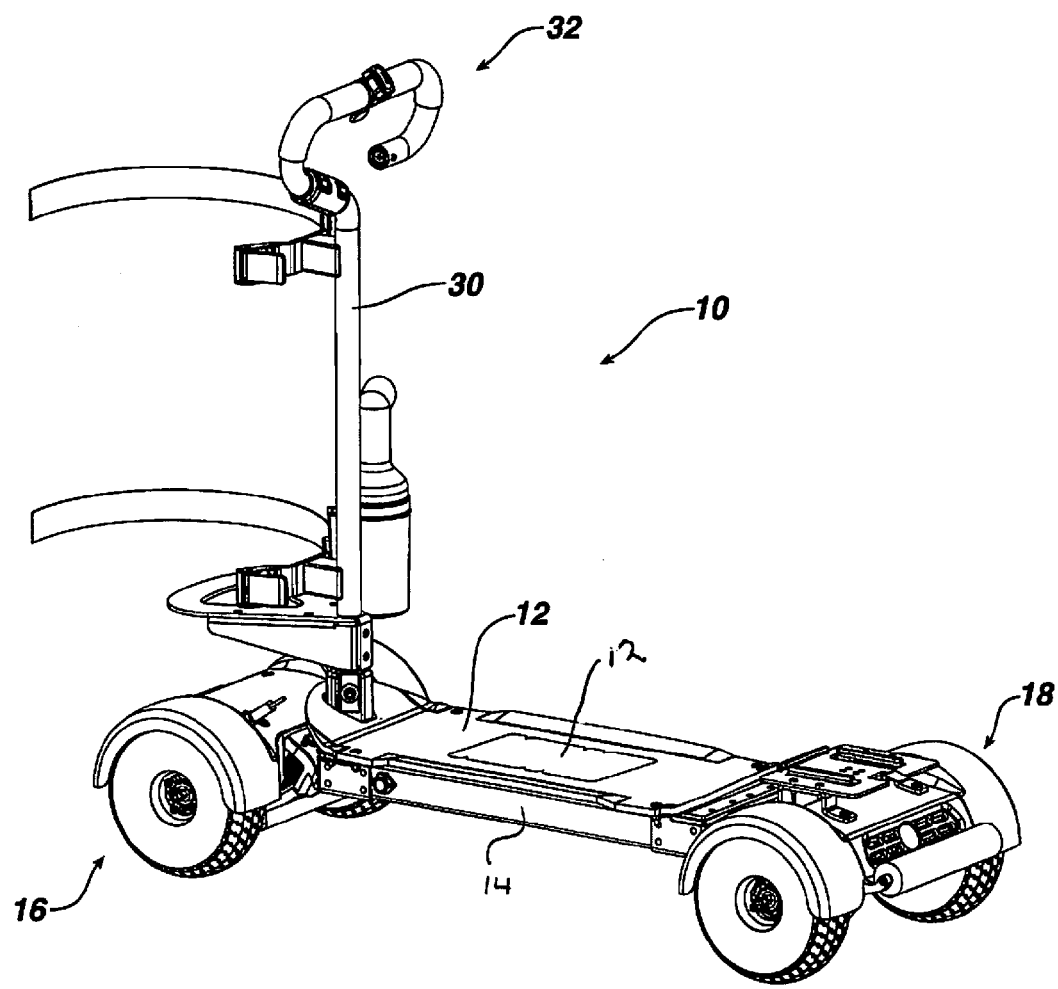
FIG. 1 is a perspective side view of the golfboard.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. Certain structures and devices may be shown in block diagram form. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "four wheel steering" refers to a steering system where all four wheels turn simultaneously when the driver steers. The four wheel steering used on the present invention has each of the wheels on the same side of the golfboard turning in opposite directions. At lower speeds, turning the rear wheels in the opposite direction to the front wheels results in a smaller turning radius and faster cornering responses.

As used herein, the term "inboard" refers to all of the components on the side of the golfboard common with the turn direction. i.e. if the golfboard is turning right all of the components on the right side of the golfboard are inboard components. The designation of which side is "inboard" is transitional, changing with the direction of turn.

As used herein, the term "outboard" refers to all of the components on the opposite side of the direction of the turn of the golfboard. i.e. if the golfboard is turning right all of the components on the left side of the golfboard are outboard components. The designation of which side is "outboard" is transitional, changing with the direction of turn.

As used herein the term "stability bar" refers to a rigid vertical member with handhold, extending vertically from the horizontal plane of the frame and directly coupled to the frame. It operates in connection with the front and rear truck assemblies and suspension system to turn the golfboard with four wheel steering upon application of a horizontal (sideways) force on the stability bar.

The present invention relates to a novel design for an electric powered, motorized deck board compatible with golf course terrains, (in that it can traverse the hills and valleys and enter upon the fairways and even greens without damaging the grass) It has enhanced, manually tuneable, four wheel steering provided by the application of horizontal force to a vertical stability bar coupled to the frame and the suspension system. The ratio of horizontal force applied to the stability bar to the turn radius of the golfboard (as well as the stiffness of the ride) is manually "tuneable" to suit the rider's height, weight and riding style by increasing/decreasing the distance between the wheel assembly and the spring plate, alone or in combination with the firmness of the shock absorbers. In alternate embodiments manually adjustable shock absorbers are used between the mounting plate and spring mount plate.

The golfboard 10 utilizes four wheel steering rather than the conventional front wheel or rear wheel steering because at lower speeds, turning the rear wheels in the opposite direction to the front wheels results in a smaller turning radius and faster cornering responses. The four wheel steering utilized here is unique because it is accomplished by the horizontal pivoting of the front and rear wheel assemblies 16 and 18 in opposite horizontally radial directions with respect to the longitudinal axis of the golfboard 10 and the frame 14. This horizontally pivots the front axle 22 and the rear axle 24 (which are attached to the wheel assemblies) rather than pivoting the wheels on the axles, as is taught in the prior art. In this way there is no positive or negative camber imparted to the wheels, maintaining more treaded wheel surface on the ground. This is known as bi-axial, four wheel steering.

Figure 2:
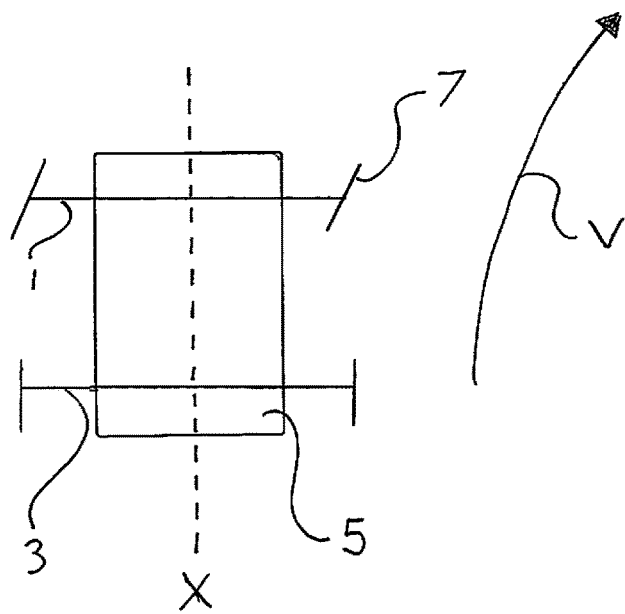
FIG. 2 is a diagrammatic top view illustration of prior art cart steering.

Looking at FIG. 2, conventional cart steering is illustrated. Here it can be seen that the front and rear axles 1 and 3 remain perpendicular to the linear axis X of the cart 5 and parallel to each other at all times. Only the front wheels 7 turn. This renders a relaxed turn radius V.

Figure 3:
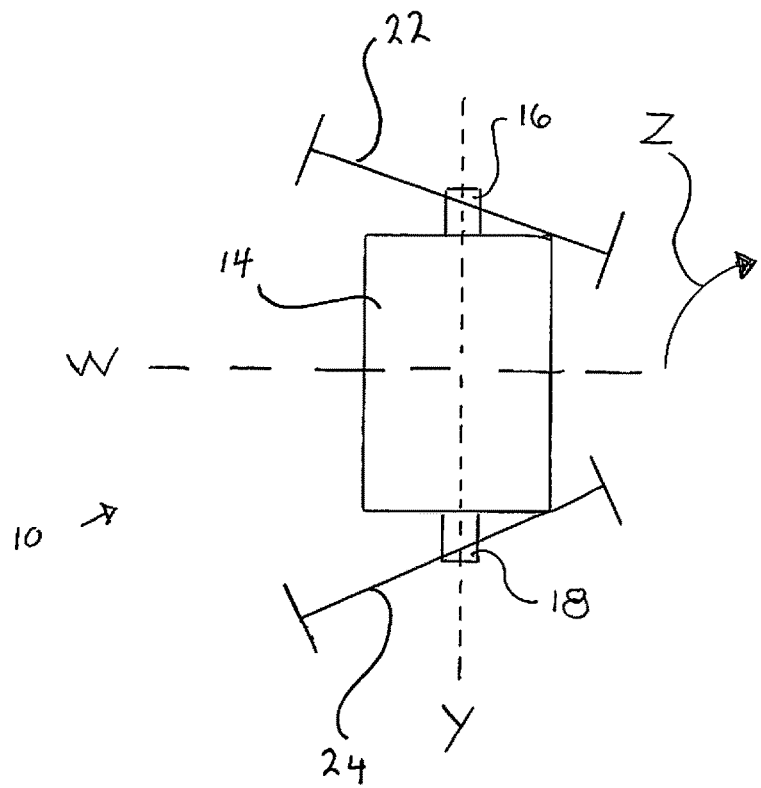
FIG. 3 is a diagrammatic top view illustration of the bi-axial, four wheel steering of the golfboard.
Figure 6:
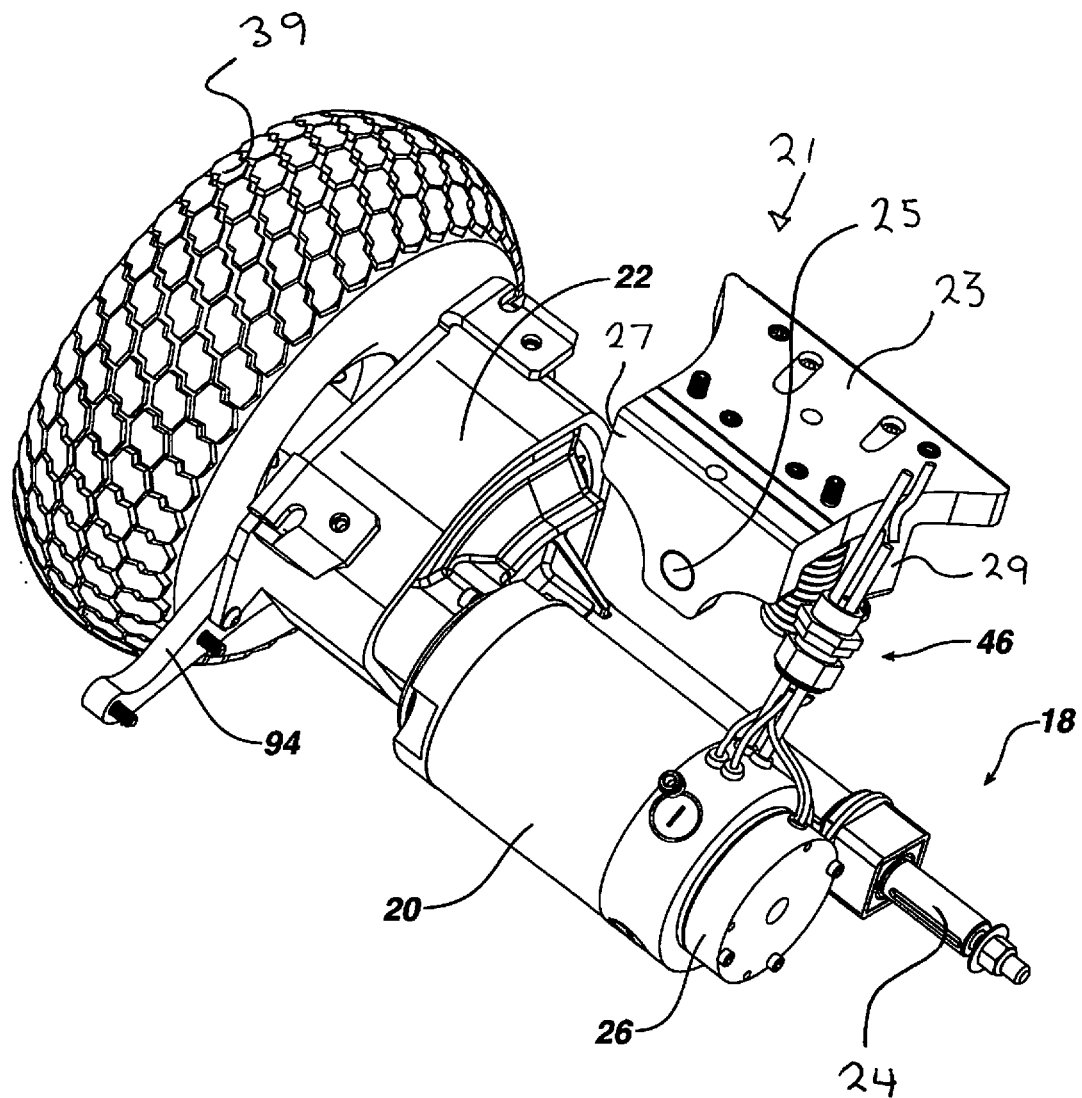
FIG. 6 is a perspective top view of a rear wheel assembly.

In contrast, looking at FIG. 3, one can understand the golfboard's bi-axial, four wheel steering. The golfboard has pivotable front 22 and rear axles 24 (rigidly mounted in the substantially similar wheel assemblies 16 and 18) that are positioned ahead and behind of the golfboard frame assembly 14 that simultaneously pivot in opposite horizontal radial directions (as seen from above) because the pivot pins 25 (FIG. 6) pivot on a vertical angle and are on opposite sides of the wheel assemblies 16 and 18. This enables the inboard wheels to move closer together to establish a smaller turn radius Z. The centers of the pivot pins 25 lie along the linear axis Y of the golfboard. The front and rear axles 24 move in mirror images about the axial centerline W of the golfboard 10.

Figure 4:
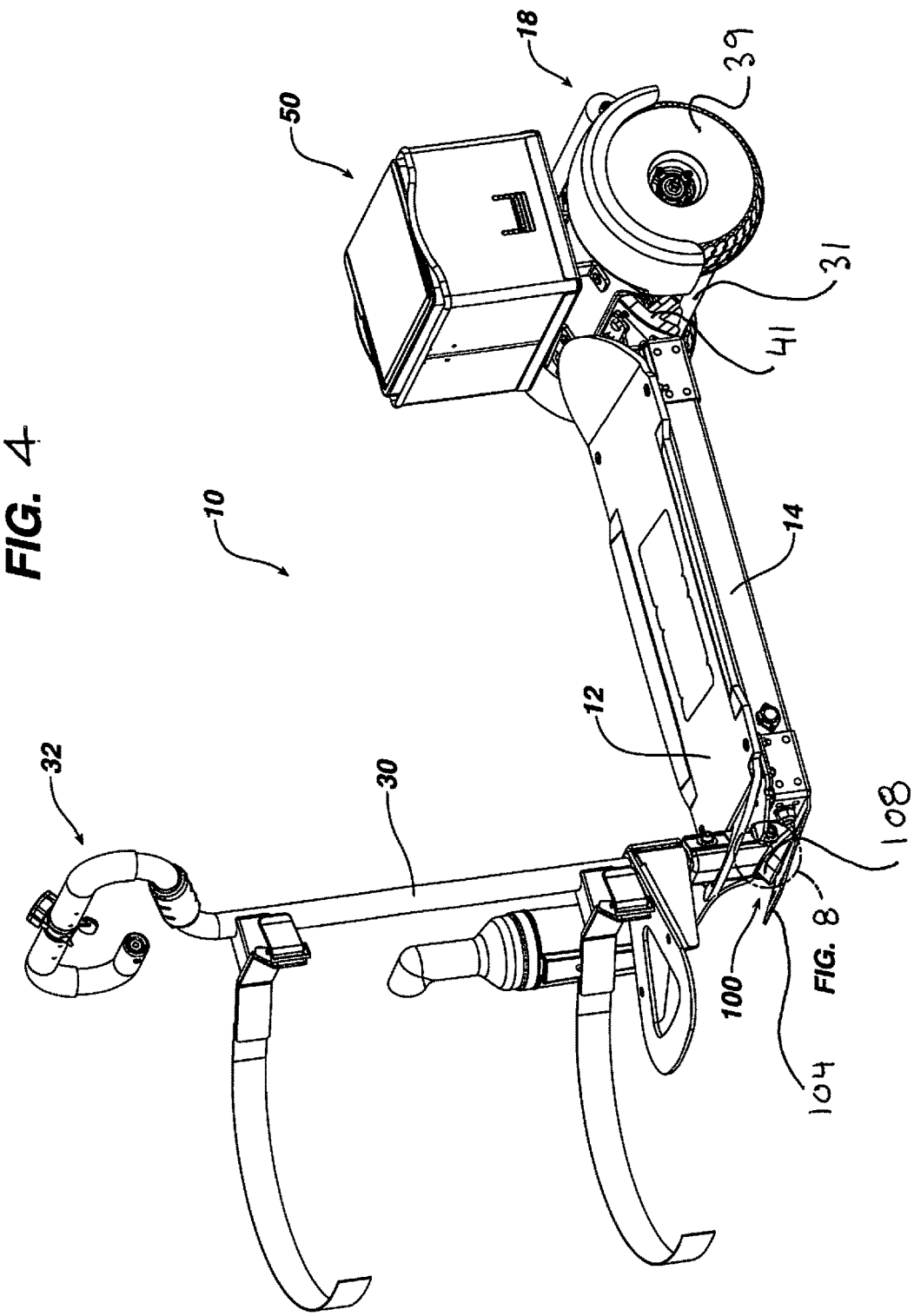
FIG. 4 is a perspective side view of the golfboard with the front wheel assembly removed.
Figure 5:
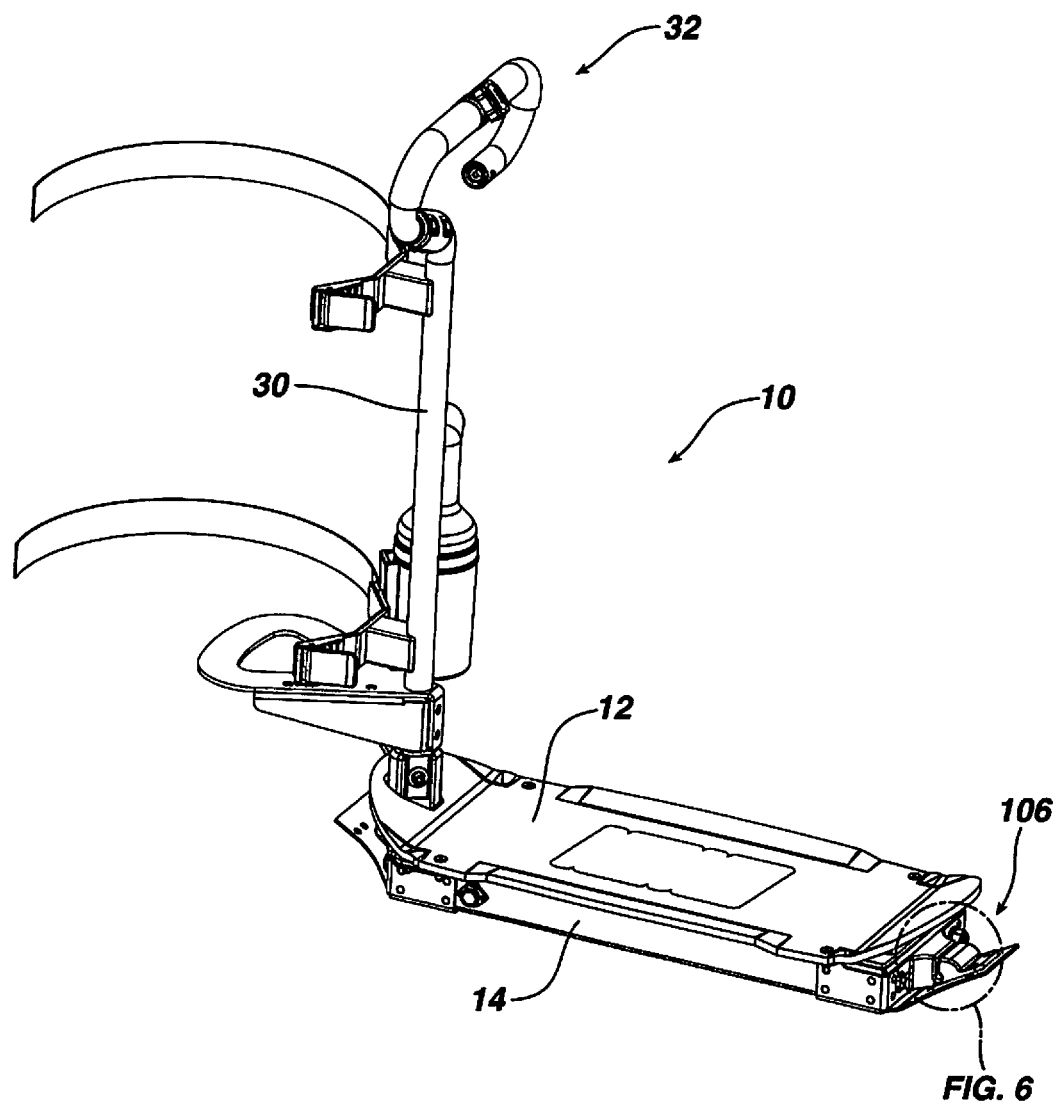
FIG. 5 is a perspective view of the golfboard with the front and rear wheel assemblies removed.
Figure 7:
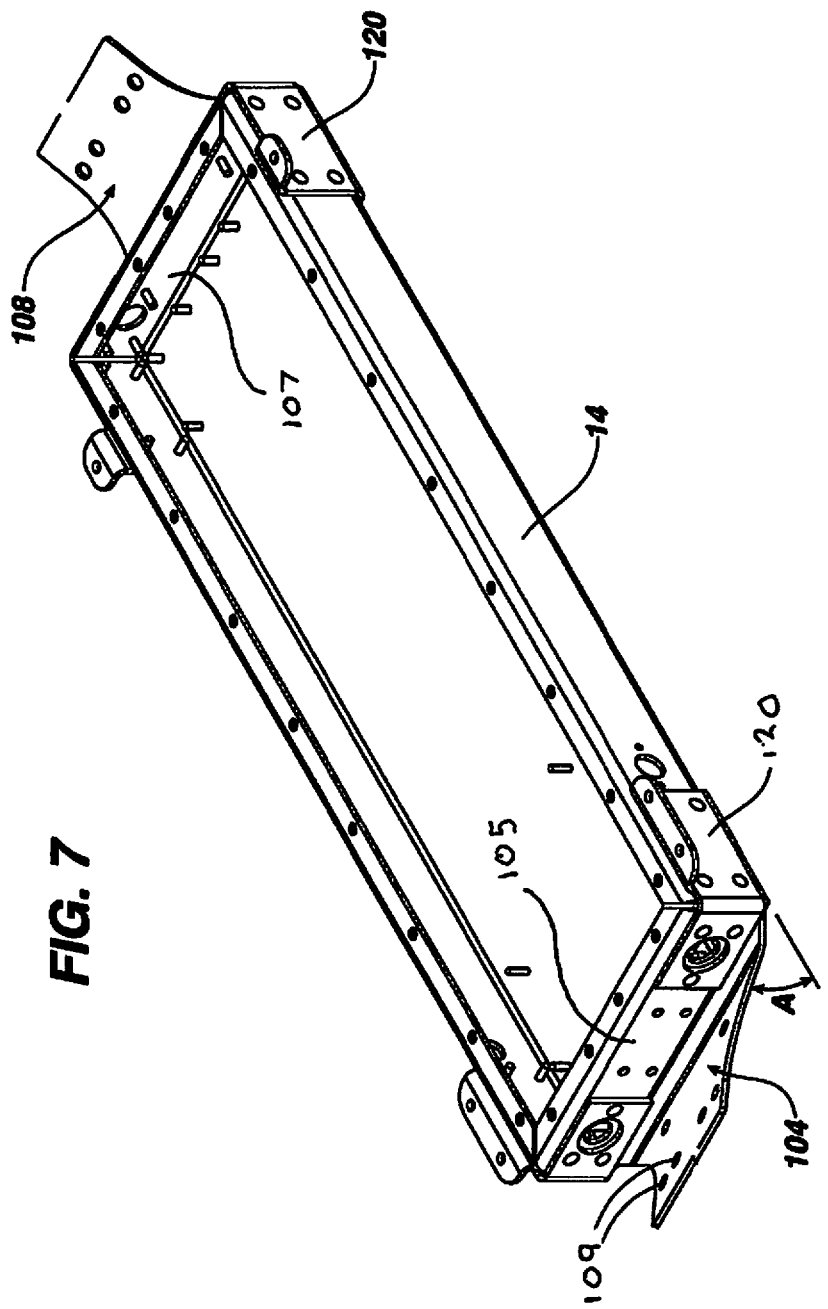
FIG. 7 is a perspective side view of a golfboard frame.
Figure 10:
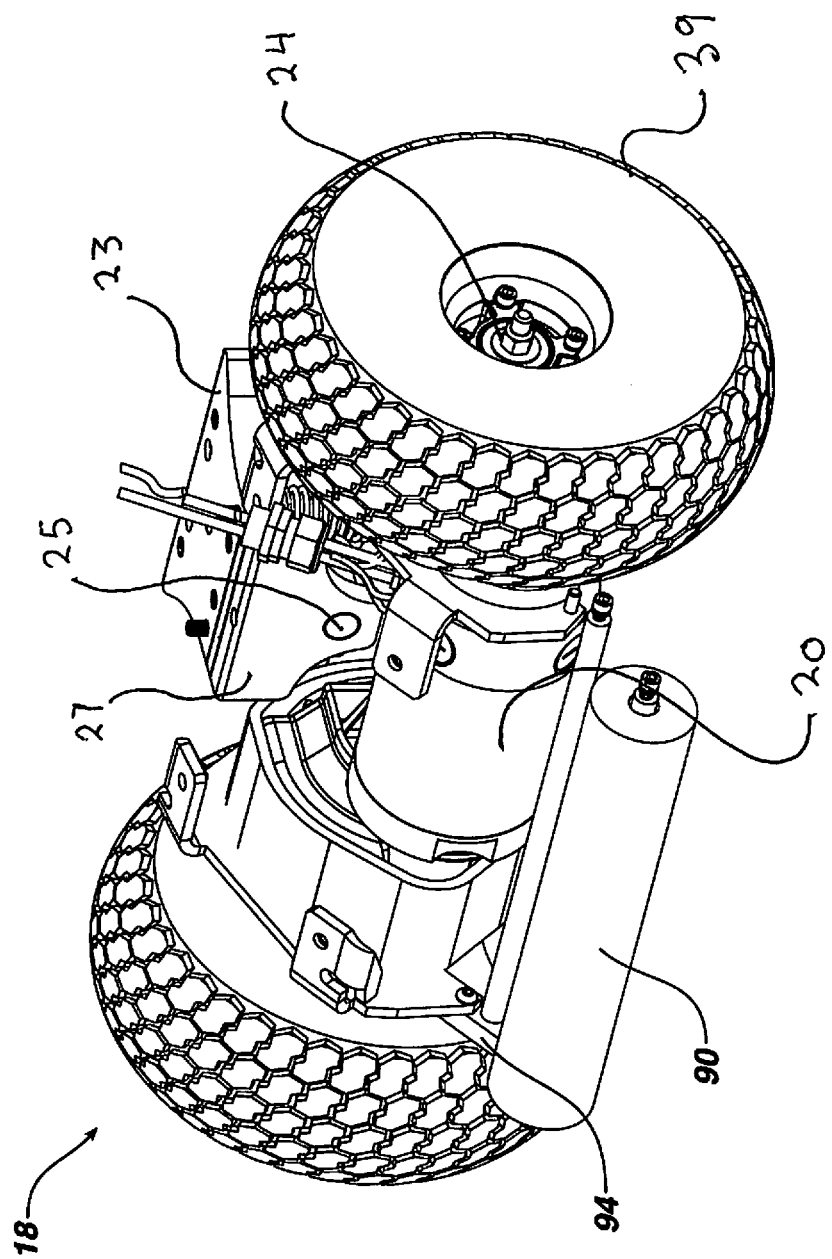
FIG. 10 is a perspective rear view of a rear wheel assembly.

Looking at FIGS. 1, 4 and 7 it can be seen that the golfboard 10 has a rectangular frame 14 made of four frame rails made of "C" channel steel for rigidity. Additional 90 degree corner stiffening braces 120 are affixed at each of the four corners of the frame 14. A generally planar deck 12 is mechanically affixed to the top face of the frame 14. There is a pair of substantially similar front and rear flexible (vertically flexing) spring plates 104 and 108 that are mechanically affixed to the bottom of the frame 14. The spring plates 104 and 108 extend beyond the proximal and distal ends of the bottom of the frame 14 and extend upward so as to form an acute angle with the vertical faces of the front and back frame rails 105 and 107. There are mounting orifices 109 that allow the mechanical fastening of the spring plates 104 and 108 to the wheel assemblies 16 and 18 via the adjustable pivot bracket 21. (FIG. 10)

Figure 8:
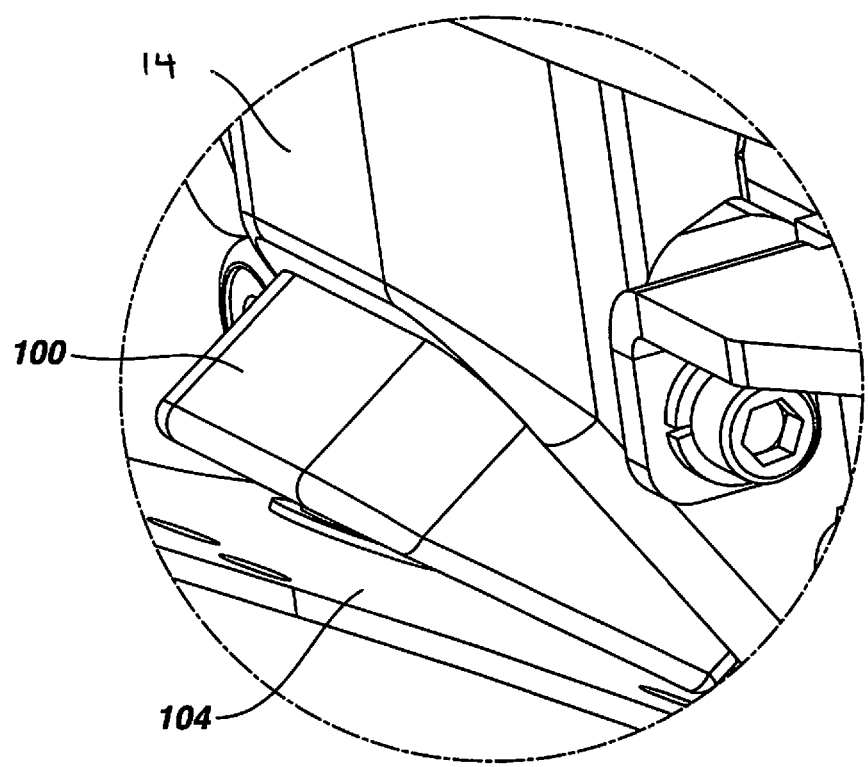
FIG. 8 is a perspective side view of a bump stop.
Figure 9:
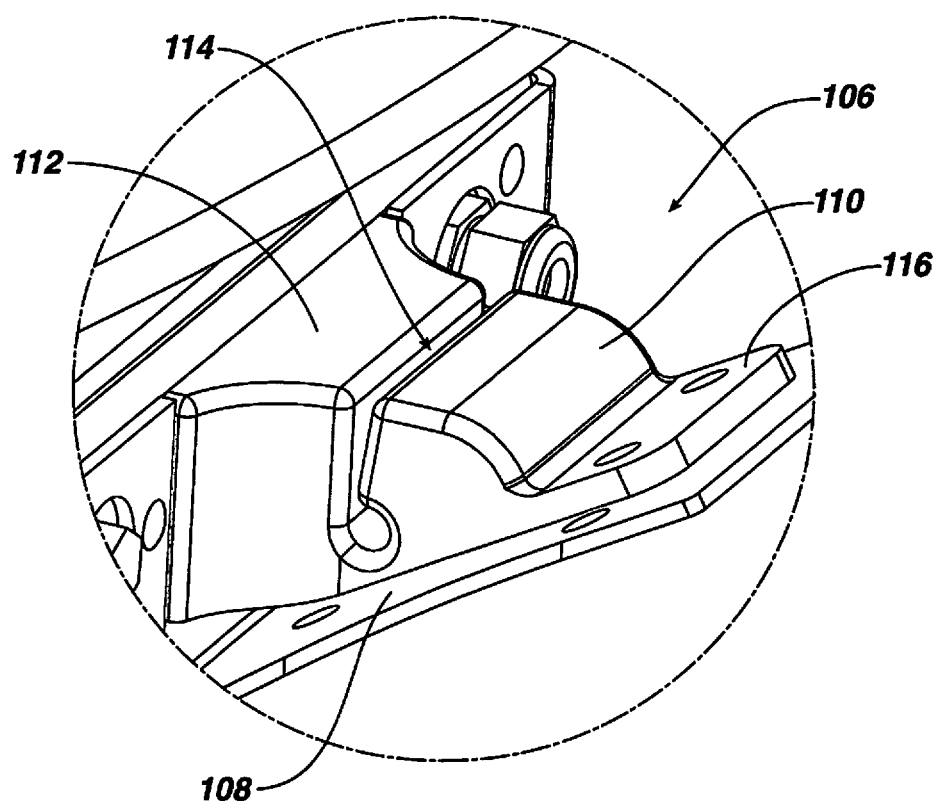
FIG. 9 is a perspective side view of a rear bump stop.

Between vertical faces of the front and back frame rails 105 and 107 and the spring end plates 104 and 108 (within the acute angular space) are elastically compressible front and rear bump stops 100 and 106. (FIGS. 8 and 9) These limit the amount of flex the spring plates can undergo when traversing rough terrain.

On the bottom face of each of the spring plates 104 and 108 a pivot bracket 21 is mechanically affixed with mechanical fasteners. (FIG. 6) This pivot bracket 21 is affixed by its mounting plate 23 to the front or rear spring plate 104 and 108. There are slotted orifices 199 in the mounting plate 23 for adjustment between the mounting plate 23 and the spring plates 104 and 108 for steering tuneability. By sliding the pivot bracket 21 along the spring plates 104 and 108 so as to increase the distance between the frame 14 and the wheel assemblies 16 and 18 the suspension gets softer and there is less required horizontal force applied to the stability bar 30 to turn the golfboard. The suspension and steering can this be tuned for individual height and weight riders. The suspension also alters the handling characteristics and can be adjusted for the overall handling capabilities.

Figure 13:
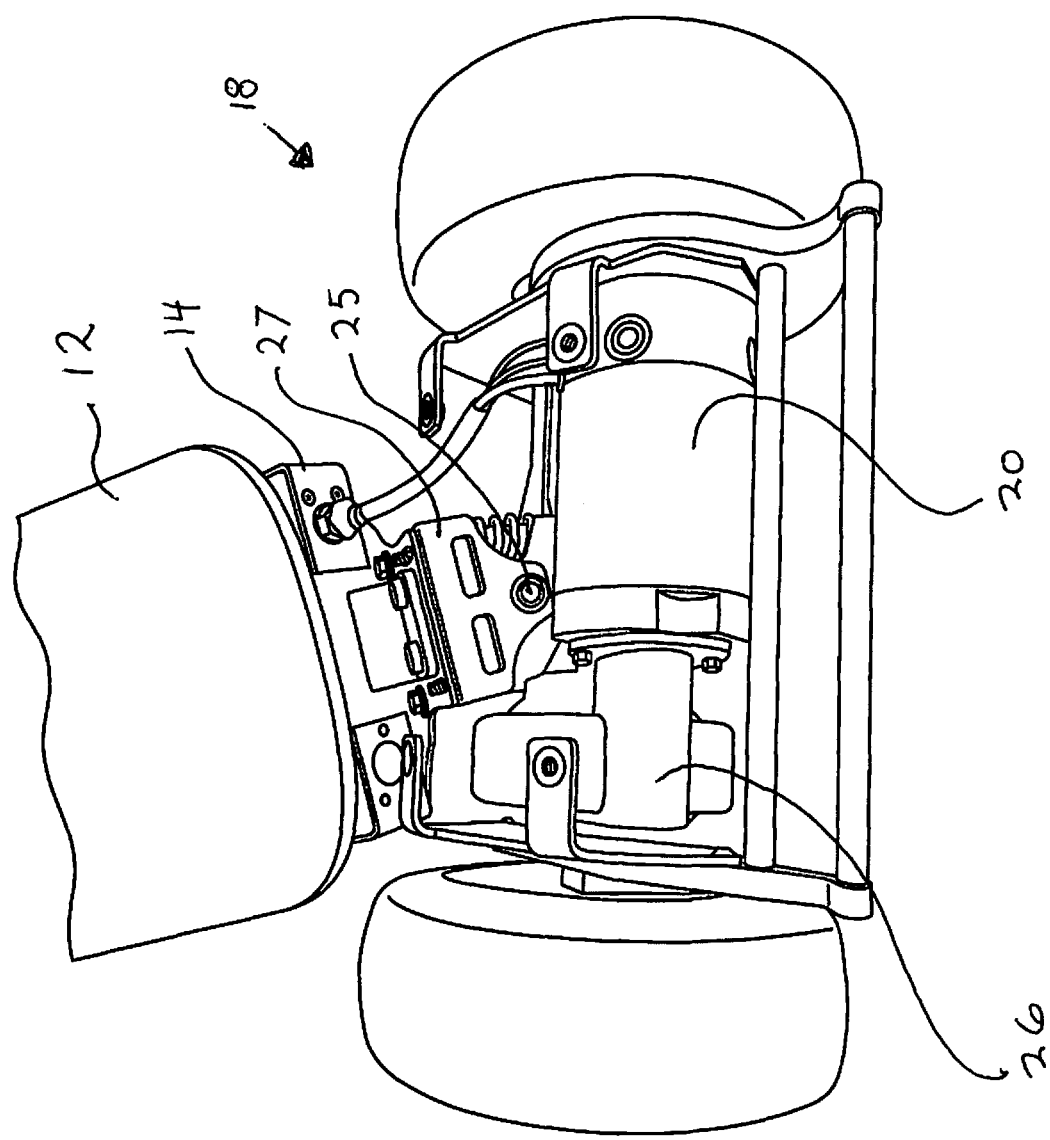
FIG. 13 is a top view of the rear wheel assembly pivoting.
Figure 14:
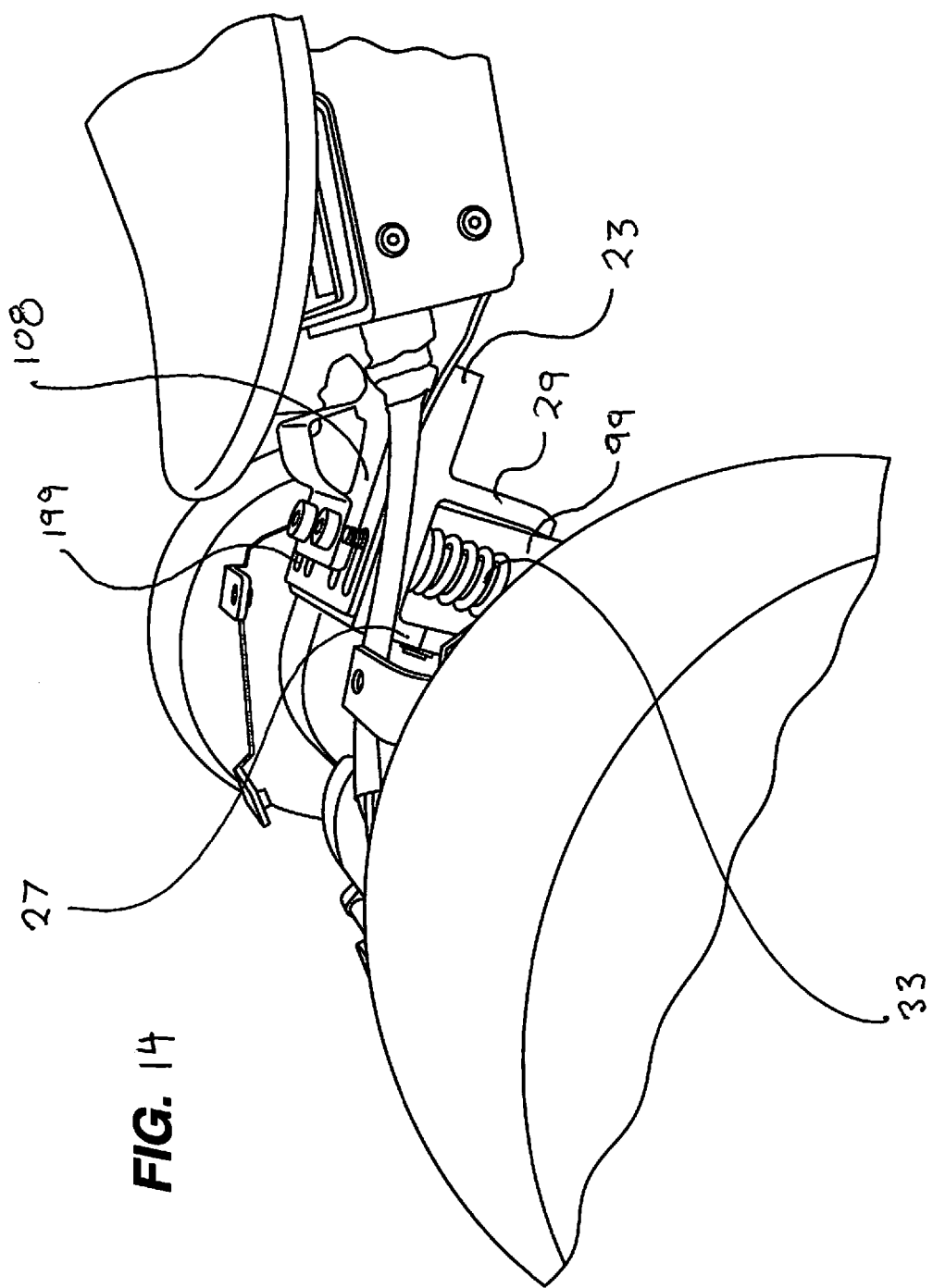
FIG. 14 is a side perspective view of the rear wheel assembly.

The pivot brackets 21 have a pair of parallel pivot flanges 27 and 29 extending normally downward from their bottom faces. The distal pivot flange 27 extends from the rear edge of a mounting plate 23 while the proximal pivot flange 29 extends from a point between the rear edge and the front edge of a mounting plate 23. The spacing between the parallel pivot flanges 27 and 29 matingly accommodates the width of the structural cross member 41 of the wheel assembly frame 31. (FIGS. 4, 13 and 14) Each pivot flange and structural cross member 41 has a through bore to accommodate the pivot pin 25.

The mounting plate 23 also has two circular grooves on its bottom face to house the top end of the two coil springs 33. The coil springs 33 reside in compression between the bottom face of the mounting plate 23 and the top face of a spring mount plate 99 that is attached to the top of the wheel assembly frames 31 (FIGS. 11 and 12) of the wheel assemblies 16 and 18. The spring mount plate 99 also has two circular grooves on its upper face to house the bottom end of the two coil springs 33.

The frames 31 of the front and rear wheel assemblies 16 and 18 operatively house the drive motors 20, the non-pivotable wheels 39, electromagnetic brakes 26, end mounts 94, axles 24, and cross bars 90, as detailed in the parent application. Centrally located in the structural cross members 41 of the frame 31 of the wheel assemblies 16 and 18 is an orifice that aligns with the through bore in the pivot flanges 21 and 29. When these are aligned, a pivot pin 25 is inserted between the structural cross member 41 of the wheel assembly frame 31 and the pivot flanges 27 and 29, such that the wheel assemblies 16 and 18 are free to pivot. This pivoting of the wheel assemblies occurs at a pivot point that lies at a vertical angle with respect to the deck 12 and the frame 14. It is this feature of pivot location that enables the bi-axial movement of the four wheel steering. (FIGS. 10-14)

With this design, the wheel assemblies 16 and 18 pivot on their pivot bracket 21 which is affixed to the spring plates 104 and 108 which are angularly disposed upward with respect to the horizontal plane of the frame 14 and deck 12. When there is a horizontal force applied to the stability bar 30 this imparts a vertical force to the frame 14, causing it to dip in the inboard direction. Thus there is both a vertical component of pivot to the frame 14 (and its connected deck 12) as well as a simultaneous horizontal component of pivot to the wheel assemblies 16 and 18. Since the flexible spring plates 104 and 108 extend beyond the proximal and distal ends of the bottom of the frame 14 at the same acute angles with the vertical faces of the front and back frame rails 105 and 107 (but from opposite ends of the golfboard), the horizontal component of pivot of the wheel assemblies 16 and 18 are mirror images about a line taken midpoint between the wheel assemblies and perpendicular to the longitudinal axis of the frame 14. This allows for bi-axle four wheel steering by the lean of the stability bar (from an applied horizontal force) that causes simultaneous, horizontal, mirror image axle pivoting to adjust the wheels for a tighter turn radius while allowing the wheels to retain a neutral camber since the wheels 39 themselves remain rotatably affixed on their axles.

When turning in a direction, the front wheel assembly 16 and rear wheel assembly 18 will always pivot such that the distance between their two inboard wheels will decrease and the distance between their outboard wheels will increase to enable efficient, small turning radius turns. It is important to note that since all of the mass of the frame 14, deck, 12 and attachments to the frame or stability bar 30 are transferred to the front wheel assembly 16 and rear wheel assembly 18 through the pivot pin 25 which is centrally located on the cross members 41 of the wheel assembly frames 31, the same amount of weight is transferred to each of the four wheels. (FIG. 13) This adds to the stability of the golfboard when turning and prevents it from tipping over on sharp turns.

The novel design of steering is accomplished in three ways: by driver lean; by pushing the stability bar sideways and down; and by a combination of both actions. The amount of horizontal force put on the stability bar 30 determines the amount of lean the deck 12 and wheel assembly frames 31 experience (as the frame tilts on the pivot pin) as well as the amount or compressive load placed on the inboard and outboard compression springs. The stability bar steering allows the front and rear axles to pivot in opposite directions when turning. Looking again at FIG. 3, when viewed from above, if turning right, the front wheel assembly 16 pivots clockwise to the right and the rear wheel assembly 18 pivots counterclockwise to the right. The inboard wheels simultaneously get closer together and the outboard wheels simultaneously move farther apart. (Turning to the left, the front wheel assembly 16 pivots counterclockwise and the rear wheel assembly pivots clockwise.) With greater amounts of horizontal force placed on the stability bar 30 the radius of the turn decreases. Each of the truck assemblies steer the golfboard into the turn.

The axles 16 and 18, are parallel at rest or when travelling in a straight line, however the axles are mirror images about an axial line W across the frame, midpoint between them. The camber of all wheels remains neutral such that the entire tread of the four wheels remain on the grass when turning. This is another safety feature to prevent the golfboard from tipping over and to maximize the amount of wheel tread on the grass. (This relates to the lowest pounds per square inch force exerted on the grass.) The deck 12 and frame 14 are reinforced to accommodate the additional torque imposed when making sharp turns.

When horizontal force is applied to the stability bar 30, the frame 14 slightly pivots axially (tips) about its longitudinal axis on the front and back pivot pins. (It is important to note that if the spring plates 104 and 108 were not angled upward with respect to the plane of the frame, the wheel assemblies and wheel axles would fail to pivot, thus failing to turn the golfboard 2.)

Figure 11:
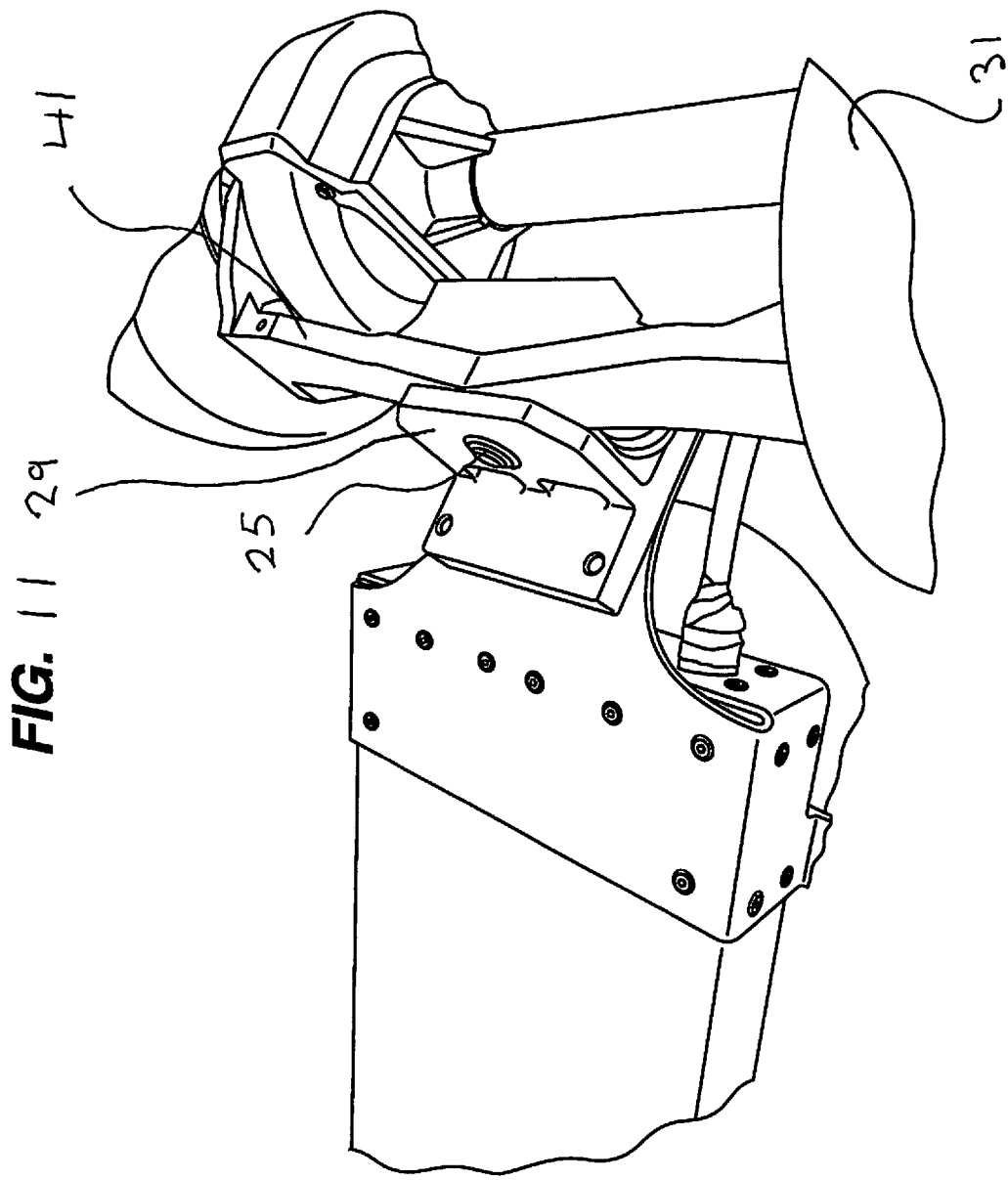
FIG. 11 is a rear perspective bottom view of the rear wheel assembly and spring plate.
Figure 12:
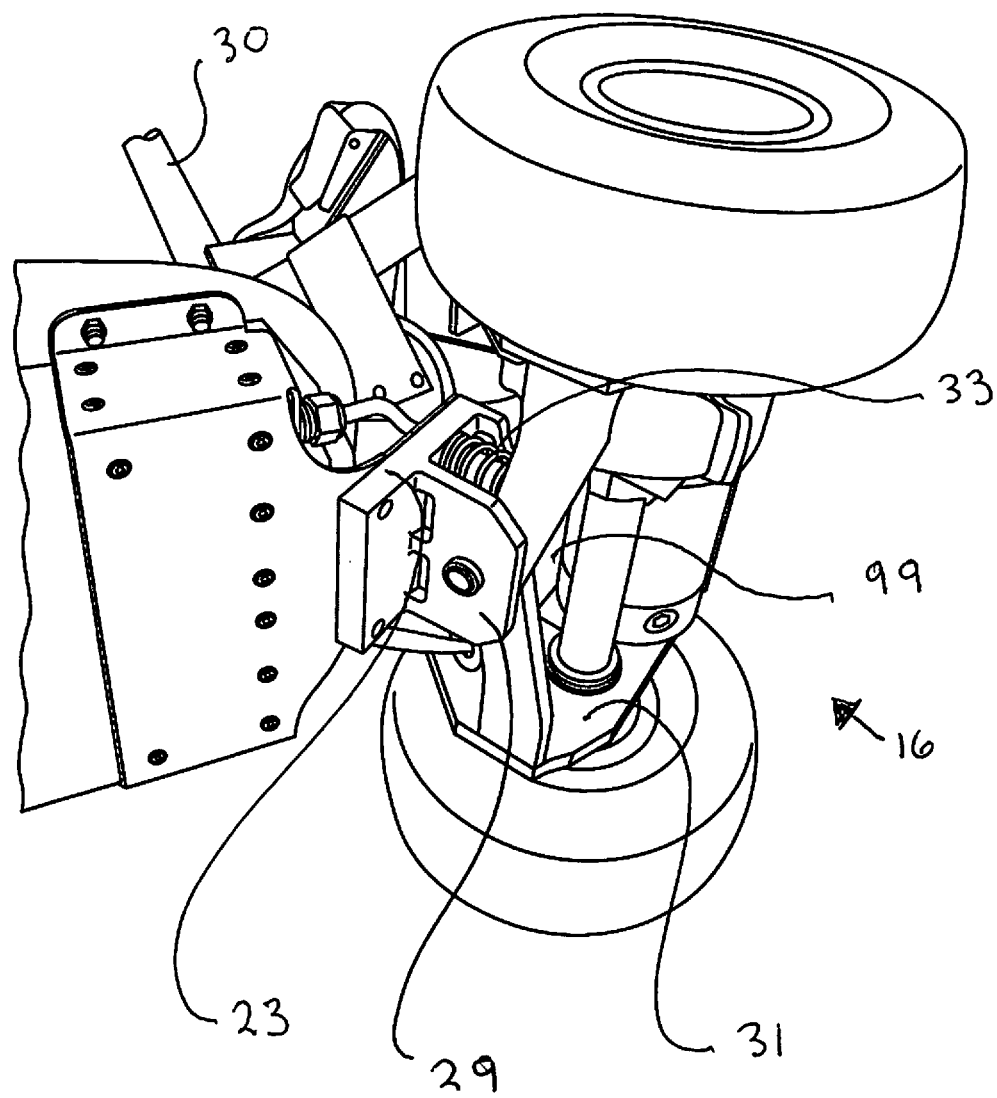
FIG. 12 is a front perspective bottom view of the front wheel assembly.

The four wheel steering is based on the horizontal force applied to the stability bar 30, and is accomplished by the combination of three design elements. First, a suspension design that incorporates a vertically angled pivot pin 25 (pivot point) for the front wheel assembly 16 that is behind the front wheel assembly 16, and a vertically angled pivot pin 25 (pivot point) for the rear wheel assembly 18 that is in front of the rear wheel assembly 18. (FIG. 13) Second, a design that places the front and rear axles axles past the front and rear of the deck and frame of the golfboard rather than directly underneath. (FIG. 1) Third, pivot points that are centered on a spring plate extending angularly upward from the horizontal, bottom face of the frame 30 of the golfboard, so as to be disposed at an acute angle with respect to the deck of the golfboard. (FIGS. 11 and 12)

The steering is manually tuneable as the four mounting mechanical fasteners between the front and rear spring plates 104 and 108 and the mounting plate 21 may be loosened and the mounting plate 21 bracket slid upward or downward along its oblong mounting orifices so as to preload the compressive pressure on the two axle springs. (FIG. 14) The more the springs are preloaded the stiffer the ride and the more vertical pressure that must be applied to the stability bar 30 to accomplish a turn of the same radius.

The two wheel assemblies 16 and 18 pivot at the midpoint of their structural cross members 41 of their frame 31 on the pivot pin 25 that passes through pivot flanges 27 and 29. (Mounting plate 21 has a Pivot flanges 27 and 29 extend from mounting plate 23 of pivot bracket 21.) This point lies on the longitudinal centerline of the frame 31. However, the front wheel assembly and the rear wheel assembly pivot in opposite directions. When turning left or right the front wheel assembly pivots such that the inboard wheel (the one on the side of the direction of the turn) moves backwards and inward towards the longitudinal centerline of the frame, and the outboard wheel moves forward and inward toward toward a line extended beyond the frame that passes through the longitudinal centerline of the frame. The rear wheel assembly pivots such that the inboard wheel (the one on the side of the direction of the turn) moves forwards and inward towards the longitudinal centerline of the frame, and the outboard wheel moves backward and inward toward toward a line extended beyond the frame that passes through the longitudinal centerline of the frame. The two wheel assemblies react to a turn stimulus (i.e. pushing on the stability bar) in mirror image reactions about an axial line across the body of the golfboard midpoint between the wheel assemblies. Said differently, the distance between the front and rear inboard wheels (on the turn side) decreases and the distance between the front and rear outboard wheels (on the non-turn direction side) increases.

While certain features and aspects have been described with respect to exemplary embodiments, one skilled in the art will recognize that numerous modifications are possible. While certain functionality is ascribed to certain system components, unless the context dictates otherwise, this functionality can be distributed among various other system components in accordance with the several embodiments.

Moreover, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Essentially, the wheel assemblies 16 and 18 (FIGS. 1, 6 and 10) and the wheel axles are connected to the golfboard frame by a spring plate that connects the deck/frame to the wheels in an angular position off of a spring plate such that movement of the horizontal plane of the deck (by leaning or by the application of horizontal force to the stability bar) results in a vertical and horizontal displacement of the axles. Wheels on either side of the golfboard move toward or away from each other simultaneously while the axle remain straightwith the wheels perpendicular to the axle at all times. Thus allowing bi-axle four wheel steering.

Having thus described the invention, what is claimed as new and desired to be secured by Letters Patent is as follows:

1. A motorized vehicle steerable from a vertical stability bar, comprising:
    a frame having a top, a front and a back;
    a deck affixed to said top of said frame;
    a front spring plate extending angularly from said frame front;
    a rear spring plate extending angularly from said frame back;
    a stability bar affixed to, and extending normally from said frame;
    a front pivot pin;
    a rear pivot pin;
    a front wheel assembly having a front side and a back side, said front wheel assembly pivotally connected at its back side to said front spring plate through said front pivot pin;
    a rear wheel assembly pivotally having a front side and a back side, said rear wheel assembly pivotally connected at its front side to said rear spring plate through said rear pivot pin; and
    wherein the exertion of a horizontal force on said stability bar tilts said deck and enables simultaneous bi-axle four wheel steering of said motorized vehicle.

2. The motorized vehicle steerable from a vertical stability bar of claim 1 further comprising:
    a front axle with a first pair of non-pivotable, rotatably connected wheels thereon, said front axle connected to said front wheel assembly; and
    a rear axle with a second pair of non-pivotable, rotatably connected wheels thereon, said rear axle connected to said rear wheel assembly.

3. The motorized vehicle steerable from a vertical stability bar of claim 2 wherein said bi-axle four wheel steering steering is the simultaneous opposite, horizontal radial pivoting of said front wheel assembly and said rear wheel assembly in mirror image movements about an axis perpendicular to the longitudinal axis of said frame and midway between said front wheel assembly and said rear wheel assembly.

4. The motorized vehicle steerable from a vertical stability bar of claim 3 wherein said simultaneous bi-axle four wheel steering pivots said front wheel assembly and said rear wheel assembly horizontally, but in opposite radial directions.

5. The motorized vehicle steerable from a vertical stability bar of claim 4 further comprising:

a front wheel assembly frame for said front wheel assembly, said front wheel assembly frame housing an operably connected first drive motor connected to said front axle and front electromagnetic brakes, and having a front pair of end mounts extending therefrom between which a front cross bar extends there between; and a rear wheel assembly frame for said rear wheel assembly, said rear wheel assembly frame housing an operably connected second drive motor connected to said rear axle and rear electromagnetic brakes, and having a rear pair of end mounts extending therefrom between which a rear cross bar extends there between.

6. The motorized vehicle steerable from a vertical stability bar of claim 5 further comprising:

a front pivot bracket;

a rear pivot bracket; and wherein said front pivot bracket is adjustably connected between said front spring plate and said front wheel assembly, and said rear pivot bracket is adjustably connected between said rear spring plate and said rear wheel assembly so as to enable steering and suspension tuning.

7. The motorized vehicle steerable from a vertical stability bar of claim 6 wherein said front spring plate and said rear spring plate are capable of vertical flexing.

8. The motorized vehicle steerable from a vertical stability bar of claim 7 further comprising:

a front spring mount plate affixed to said front wheel assembly frame;

a rear spring mount plate affixed to said rear wheel assembly frame;

a pair of front shock absorbers, a pair of rear shock absorbers, and wherein said pair of front shock absorbers are compressibly constrained between said front spring mount plate and said front mounting plate, and said pair of rear shock absorbers are compressibly constrained between said rear spring mount plate and said rear mounting plate.

* * * * *